Patented Jan. 12, 1937

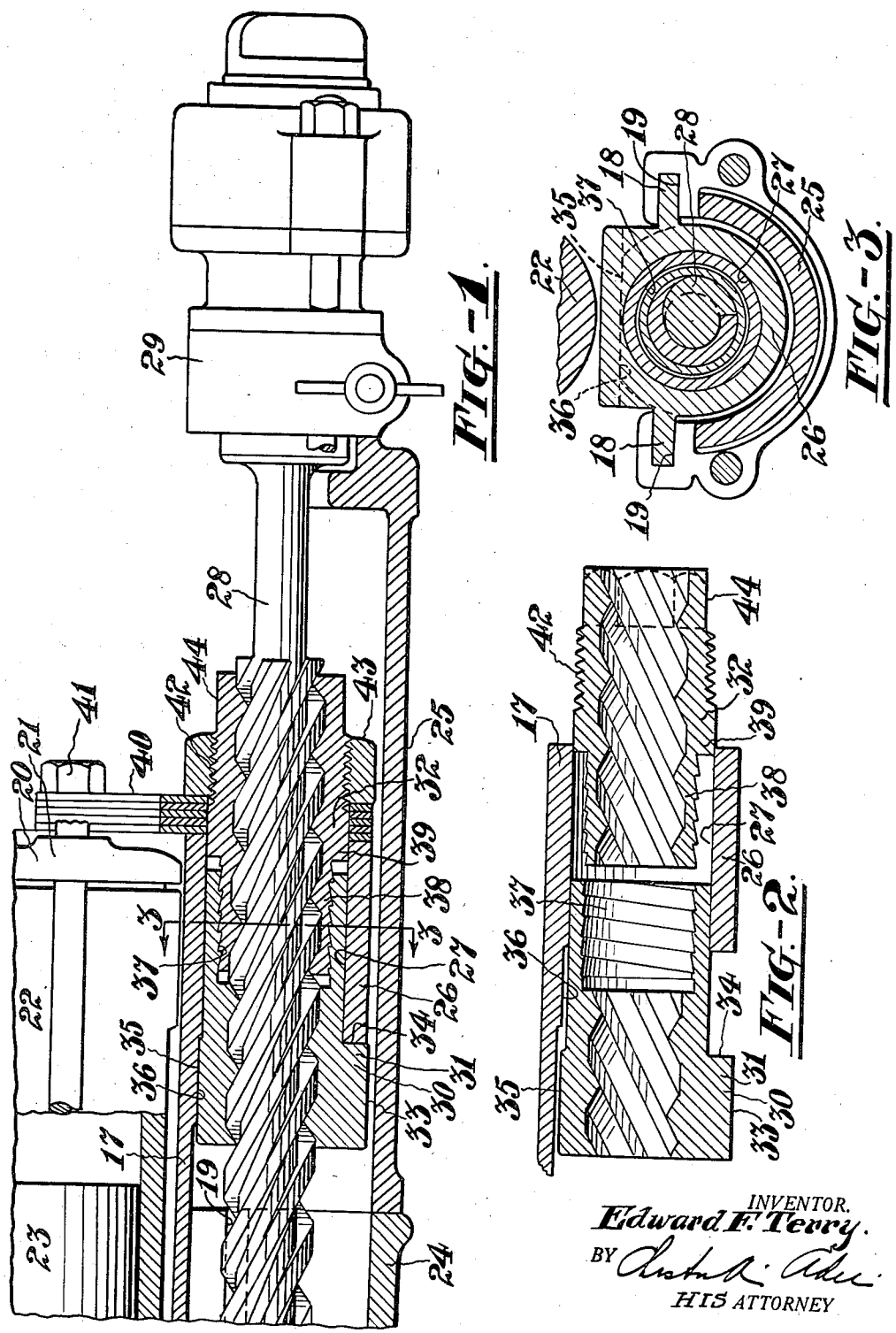

2,067,357

UNITED STATES PATENT OFFICE 2,067,357

FEEDING DEVICE

Edward F. Terry, Phillipsburg, N. J., assignor to Ingersoll-Rand Company, Jersey City, N. J., a corporation of New Jersey Application May 16, 1935, Serial No. 21,761

1 Claim. (Cl. 74—424.8)

This invention relates to rock drills, and more particularly to a feeding device employed for effecting relative longitudinal movement between a rock drill and its support.

One object of the invention is to compensate for wear on the threads of the feed screw and the portion of the rock drill which the feed screw engages.

Another object is to enable the adjustment necessary for such compensation to be expeditiously made without requiring removal of the parts from the positions which they occupy in the assembly.

Other objects will be in part obvious and in part pointed out hereinafter.

In the accompanying drawing in which similar reference numerals refer to similar parts, Figure 1 is a longitudinal elevation, partly in section, of a portion of a rock drill and its support having the invention applied thereto, Figure 2 is a view similar to Figure 1 showing the manner in which the feed nuts may be assembled in the rock drill, and Figure 3 is a transverse view taken through Figure 1 on the line 3—3.

Referring more particularly to the drawing, 20 designates a motor illustrated as a rock drill of which only the back head 21 and a portion of the cylinder 22 are shown. Within the cylinder is a reciprocatory hammer piston 23 to deliver blows to the working implement, as for instance a drill steel (not shown). A suitable support is provided for the motor 20 in the form of a shell 24 having a rearward extension 25 which may be secured to the shell in any well known manner.

In accordance with a well known practice, the cylinder is provided with a demountable saddle 17 having integral guides 18 which slidably engage guideways 19 in the shell 24. On the rear end of the saddle is a lug 26 which extends into the shell 24 and has a bore 27 through which extends a feed screw 28 adapted to effect longitudinal movement of the motor with respect to the shell.

The front end of the feed screw may be journaled in the shell in the usual manner and the rear end of the feed screw may be connected to a device designated 29 for determining the direction of rotation of the feed screw. The device 29 may be of any well known type adapted for this service, as for instance that illustrated in the United States Patent No. 1,867,922 granted to W. A. Smith, Sr., July 19, 1932.

The recess 27 serves as a receptacle for a device 30 adapted to operatively connect the feed screw to the motor 20. The device 30, constructed in accordance with the practice of the invention, comprises a pair of feed nuts 31 and 32 each having internal threads for cooperation with the threads of the feed screw 28 and extending slidably into the recess 27.

The nuts 31 and 32 may both be inserted into the recess 27 through the front end thereof or, respectively, through the front and rear ends of the recess 27. The nut 32 is freely rotatable within the recess 27. On the front end is a head 33 of which a shoulder 34 abuts the adjacent end of the nut 31 of the lug 26 and on the side of the head 33 is a flatted surface 35 which, in the assembled position of the nut 31, engages a similar surface 36 on the saddle 17 to prevent rotary movement of the nut 31 with respect to the lug 26.

In the use of devices of the character to which the present invention pertains it has been found that, owing to the severe usage to which the rock drilling mechanism is subjected, the useful period of service of the feed screw 28 and the feed nut is generally of short duration. If a loose connection exists between them, the vibration incident to the operation of the rock drill causes the threads to wear away rapidly, thus necessitating replacement of the feed screw and the feed nut after a brief period of service. As will be readily understood an undue amount of clearance between the feed screw and the feed nut will also greatly reduce the effectiveness of the device 29 or such means as may, in certain types of drilling mechanism, be provided for imparting rotary movement to the feed screw for the reason that a firm transmission path should be maintained between the feed nut and the feed screw. Otherwise a very considerable portion of the force of the blow of the hammer piston 23 will be wasted in shifting the rock drill the distance permitted by the clearance between the threads of the feed screw and the feed nuts.

In order, therefore, to compensate for any wear which may take place on the side surfaces of the threads of the feed screw and the feed nuts these elements are threadedly connected to each other so that the one may be shifted axially with respect to the other and the nuts will, at the same time, be interlockingly connected to each other, thus, in effect, serving as a unitary structure, which is desirable. The preferred mode of connecting the nuts 31 and 32 consists in forming an internally threaded recess 37 in the inner end of the nut 31 for the accommodation of an externally threaded extension 38 on the adjacent end of the nut 32.

The portion 39 of the nut 32 adjacent the threaded extension 38 is of cylindrical shape of the same diameter as the nut 31 and adapted to slidably engage the wall of the recess 27. This portion may, moreover, extend slidably through a plate or plates 40 secured to the motor 22, as by bolts 41, and seating against the rear end of the lug 26 to connect the saddle 17 to the motor. External threads 42 are formed on the nut 32 for the accommodation of a lock nut 43 which clamps the plates 40 securely to the saddle and also locks the nut 32 against unauthorized movement.

The rearmost portion of the feed nut 32 is preferably in the form of a polygonal head 44 for the accommodation of a wrench. In practice, the parts comprising the feeding mechanism are assembled in the following manner. First, the nuts are threadedly connected together in substantially the correct assembled relationship and inserted in the recess 27.

The feed screw 28 is then threaded through the nuts and secured in position on the shell, it being understood, of course, that the nut 31 occupies a position in which the shoulder 34 abuts the front end of the lug 26. The nut 32 may then be adjusted to assure the correct position of the threads of both nuts 31 and 32 with respect to those of the feed screw 28, and the lock nut 43 may then be drawn up tightly against the plates 40 to lock both feed nuts 31 and 32 fixedly in position in the recess 27.

If, after some period of usage, the threads of the feed screw and the feed nuts become worn, thus bringing about the undesirable condition above referred to, the threads of the feed nuts 31 and 32 may be brought into correct bearing relationship with the threads of the feed screw 28 by unthreading the lock nut 43 and rotating the feed nut 32 to actuate it slightly in the direction of the feed nut 31. After this adjustment has been made the lock nut 43 is tightened and the feed nuts will again be in position to prevent axial play between the screw and the rock drill at the instant of reversal of the hammer piston in the motor.

I claim:

In a feeding device, the combination of a casing having a recess and a feed screw extending through the recess, a feed nut in the recess and threadedly engaging the feed screw, means for preventing rotary movement of the feed nut with respect to the casing, a second feed nut in the recess threadedly engaging the feed screw and having a portion of reduced diameter threadedly engaging the first mentioned feed nut for effecting axial adjustment of the feed nuts with respect to the feed screw and being of the same diameter as the first mentioned feed nut and the recess, and a lock nut on the last mentioned feed nut acting against the casing to hold the feed nuts fixedly in the casing and with respect to each other.

EDWARD F. TERRY.